United States Patent
Ito et al.

(10) Patent No.: US 10,608,257 B2
(45) Date of Patent: *Mar. 31, 2020

(54) ELECTRODE FOR NONAQUEOUS ELECTROLYTE SECONDARY CELL AND NONAQUEOUS ELECTROLYTE SECONDARY CELL

(71) Applicant: TOPPAN PRINTING CO., LTD., Tokyo (JP)

(72) Inventors: Noriyuki Ito, Tokyo (JP); Hitoshi Kurihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,882

(22) Filed: Oct. 25, 2017

(65) Prior Publication Data

US 2018/0159135 A1   Jun. 7, 2018

Related U.S. Application Data

(63) Continuation of application No. PCT/JP2016/063599, filed on May 2, 2016.

(30) Foreign Application Priority Data

May 8, 2015   (JP) .................. 2015-095874

(51) Int. Cl.
  *H01M 4/64*   (2006.01)
  *H01M 4/133*   (2010.01)
  (Continued)

(52) U.S. Cl.
  CPC .......... *H01M 4/64* (2013.01); *H01M 4/0404* (2013.01); *H01M 4/13* (2013.01); *H01M 4/133* (2013.01);
  (Continued)

(58) Field of Classification Search
  None
  See application file for complete search history.

(56) References Cited

U.S. PATENT DOCUMENTS

| 2009/0004566 | A1* | 1/2009 | Shirane | H01M 4/133 |
| | | | | 429/220 |
| 2009/0246632 | A1* | 10/2009 | Fukui | H01M 4/134 |
| | | | | 429/217 |

(Continued)

FOREIGN PATENT DOCUMENTS

| JP | S55-151769 A | 11/1980 |
| JP | 2001-283843 | 10/2001 |

(Continued)

OTHER PUBLICATIONS

Teofil Jesionowski (2009), "Alkoxysilane-Functionalized Silica Fillers—Preparation and Characterization," Composite Interfaces, vol. 16, Issue 2-3, pp. 115-129 (abstract only) (Year: 2009).*

(Continued)

*Primary Examiner* — Amanda J Barrow
(74) *Attorney, Agent, or Firm* — Foley & Lardner LLP

(57) ABSTRACT

An electrode for a nonaqueous electrolyte secondary cell capable of improving the cycle characteristics. The electrode includes a collector and an active material layer formed on a surface of the collector and containing an active material, a binder, and a graphite material. The active material comprises $SiO_x$ particles whose surfaces are bonded with an organic material having one or more functional groups selected from the group consisting of a phenylamino group, an imidazole group and an amino group. The binder is composed of a water-soluble polymer made of acrylic acid or a salt thereof.

6 Claims, 1 Drawing Sheet

(51) Int. Cl.
   *H01M 4/587*   (2010.01)
   *H01M 4/134*   (2010.01)
   *H01M 4/38*    (2006.01)
   *H01M 4/62*    (2006.01)
   *H01M 4/04*    (2006.01)
   *H01M 4/60*    (2006.01)
   *H01M 4/13*    (2010.01)
   *H01M 4/36*    (2006.01)
   *H01M 4/48*    (2010.01)
   *H01M 10/0525* (2010.01)
   *H01M 10/052*  (2010.01)

(52) U.S. Cl.
   CPC .......... *H01M 4/134* (2013.01); *H01M 4/364* (2013.01); *H01M 4/386* (2013.01); *H01M 4/48* (2013.01); *H01M 4/483* (2013.01); *H01M 4/587* (2013.01); *H01M 4/60* (2013.01); *H01M 4/622* (2013.01); *H01M 4/625* (2013.01); *H01M 10/052* (2013.01); *H01M 10/0525* (2013.01)

(56) References Cited

U.S. PATENT DOCUMENTS

| | | | | |
|---|---|---|---|---|
| 2011/0014521 | A1* | 1/2011 | Matsuyama | H01M 4/0404 429/217 |
| 2013/0252110 | A1* | 9/2013 | Park | H01M 4/13 429/231.8 |
| 2014/0011092 | A1* | 1/2014 | Yamamoto | H01B 1/04 429/232 |
| 2014/0295267 | A1* | 10/2014 | Wang | H01M 4/366 429/213 |
| 2014/0335410 | A1* | 11/2014 | Loveridge | H01M 4/622 429/217 |
| 2014/0346618 | A1* | 11/2014 | Lahlouh | G01N 27/403 257/414 |
| 2015/0086873 | A1* | 3/2015 | Hotta | H01M 4/364 429/231.8 |
| 2016/0211522 | A1* | 7/2016 | Kurihara | H01M 4/04 |

FOREIGN PATENT DOCUMENTS

| | | | | |
|---|---|---|---|---|
| JP | 2005-293942 | | 10/2005 | |
| JP | 2006-196338 | | 7/2006 | |
| JP | 2009-011928 | * | 1/2011 | ............ C01B 33/02 |
| JP | 2011-011928 | | 1/2011 | |
| JP | 2011-049046 | | 3/2011 | |
| JP | 2013-145669 | | 7/2013 | |
| JP | 2013-161832 | | 8/2013 | |
| JP | 2015-069878 | A | 4/2015 | |
| WO | WO-2012/017738 | | 2/2012 | |
| WO | WO 2014/095811 | * | 6/2014 | ............ H01M 4/133 |
| WO | WO-2015/046517 | | 4/2015 | |
| WO | WO-2015046517 | A1 * | 4/2015 | .............. H01M 4/04 |

OTHER PUBLICATIONS

International Search Report issued in International Patent Application No. PCT/JP2016/063599 dated Aug. 2, 2016.

Extended European Search Report dated Aug. 24, 2018 in corresponding application No. 16792615.3.

* cited by examiner

ELECTRODE FOR NONAQUEOUS ELECTROLYTE SECONDARY CELL AND NONAQUEOUS ELECTROLYTE SECONDARY CELL

CROSS-REFERENCE TO RELATED APPLICATIONS

This application is a continuation application filed under 35 U.S.C. § 111(a) claiming the benefit under 35 U.S.C. §§ 120 and 365(c) of International Application No. PCT/JP2016/063599, filed on May 2, 2016, which is based upon and claims the benefit of priority of Japanese Patent Application No. 2015-095874, filed on May 8, 2015, the entireties of which are hereby incorporated by reference.

TECHNICAL FIELD

The present invention relates to an electrode for a nonaqueous electrolyte secondary cell and a nonaqueous electrolyte secondary cell using the electrode.

BACKGROUND ART

Nonaqueous electrolyte secondary cells are widely used for power supplies for mobile devices, such as laptop computers or mobile phones. Furthermore, recently, nonaqueous electrolyte secondary cells have been installed in electric cars or the like, and are gaining attention in new fields. The automotive field seeks to achieve higher energy density in secondary cells, especially for improving cruising distance, which is regarded as important to the performance required for nonaqueous electrolyte secondary cells.

Generally, anodes made of graphite-based active materials are used as anodes for nonaqueous electrolyte secondary cells. The theoretical capacity of graphite is 372 mAh per gram of active material. In contrast, recently, silicon (Si) or tin (Sn) is drawing attention as an active material that has a capacity exceeding graphite. The theoretical capacity of silicon is 4200 mAh/g per 1 g of an active material, and similarly, that of Sn is 990 mAh/g per 1 g of an active material.

Since silicon has approximately 11 times the capacity of graphite, the volume change associated with occlusion and release of lithium ions is large and thus the volume increases by a factor of approximately 4 due to lithium occlusion. Compared to graphite, an electrode using an active material having a large capacity experiences a large volume change during charging and discharging. Therefore, there are risks that the conductive path of the electrode may be disconnected, or the active material may be separated from the electrode due to pulverization, or there may be a peeling between the collector and the active material layer. These could be factors of deterioration in the cycle characteristics of secondary cells. Accordingly, the development of an anode is underway, which uses a metal oxide with a smaller discharge capacity and with a smaller volume expansion compared to the aforementioned metal based material. However, problems similar to the above are still caused even when such a metal oxide-based active material is used, and the problems have not yet been completely solved.

Accordingly, PTL 1, for example, proposes an electrode using compound active material particles in which the surfaces of silicon particles are each covered with a carbon layer. However, use of only the covering layer is not sufficient to suppress pulverization due to the large volume change in the simple substance of alloy-based active material particles.

To avoid disconnection of the conductive path of the electrode or separation of the active material conductive path from the electrode due to pulverization, or peeling between the collector and the active material layer, for example, PTL 2 proposes that the surfaces of the silicon particles are treated with a silane coupling agent having a specific functional group (a functional group having $\pi$ electrons or a functional group containing an element having a lone pair), to produce a strong interaction between a conductive assistant, such as carbon, and a metal foil collector. However, PTL 2 does not teach the type of the binder. To improve cycle characteristics, the binding strength is required to be enhanced.

In PTL 3, an alginic acid having a good affinity for a carbon-based active material and a conductive assistant are used as a binder for an electrode to prevent peeling of the anode active material or the conductive assistant and thus improving the cycle characteristics. However, since a silicon-based active material is different from a carbon-based active material in the surface conditions and physical properties, the configuration described in PTL 3 cannot be applied as it is.

PTL 4, for example, proposes a method of improving cycle characteristics of an anode containing silicon. In the method, a surface-treated silicon-based active material is mixed with a binder, followed by heat treatment, and dehydration and condensation, to increase binding strength and to thereby prevent separation of the active material from the electrode. In PTL 5, an electrode is formed by providing a coating of an anode active material slurry, to which polycarboxylic acid or polyamine added has been added, followed by heating, to increase binding strength and to thereby prevent separation of the active material from the electrode. However, a covalent binding established between a binder and an active material by heat treatment, cannot be recovered once the binding is cut due to the change in the volume of the active material associated with charging and discharging. This leads to a problem of deteriorating cycle characteristics.

CITATION LIST

Patent Literature

PTL 1: JP 2001-283843 A
PTL 2: JP 2011-11928 A
PTL 3: JP2013-161832 A
PTL 4: JP2011-49046 A
PTL 5: WO2012/017738 A

SUMMARY OF THE INVENTION

Technical Problem

An object of the present invention is to provide an electrode for a nonaqueous electrolyte secondary cell that can improve cycle characteristics of a nonaqueous electrolyte secondary cell when used as an anode for the nonaqueous electrolyte secondary cell.

Solution to Problem

In order to solve the problem, the first aspect of the present invention is an electrode for a nonaqueous electrolyte secondary cell having a collector and an active material layer formed on a surface of the collector, characterized in that: the active material layer contains an active material, a binder and a graphite material; the active material comprises $SiO_x$ particles whose surfaces are bonded with an organic material having one or more functional groups selected from a group consisting of a phenylamino group, an imidazole group and an amino group; and the binder is composed of a water-soluble polymer made of an acrylic acid or a salt of the acrylic acid.

The phenylamino group is a functional group with one H atom removed from phenylamine.

A second aspect of the present invention is a nonaqueous electrolyte secondary cell having the electrode of the first aspect serving as an anode.

Advantageous Effects of Invention

According to the electrode for a secondary cell of the aspect of the present invention, the silicon-based active material comprises $SiO_x$ particles whose surfaces are bonded with an organic material having one or more functional groups selected from the group consisting of a phenylamino group, an imidazole group and an amino group, to thereby improve binding properties between the silicon-based active material, the binder, and the graphite material.

The electrode for a secondary cell of the aspect of the present invention is used as the anode for a nonaqueous electrolyte secondary cell to improve the cycle characteristics of the nonaqueous electrolyte secondary cell.

DESCRIPTION OF REPRESENTATIVE EMBODIMENTS

Figure 1:
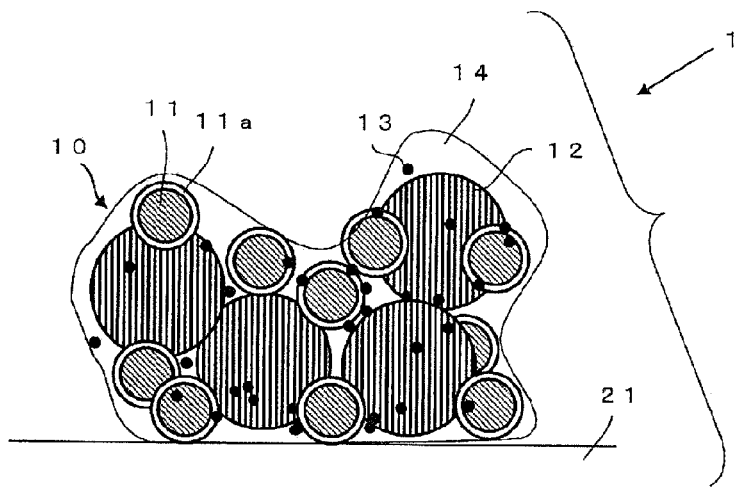
FIG. 1 is a schematic diagram illustrating an electrode for a nonaqueous electrolyte secondary cell according to an embodiment of the present invention.

An electrode for a nonaqueous electrolyte secondary cell and a method for manufacturing the same according to an embodiment of the present invention will be described below.

The drawings are schematic, and the relationship between thickness and planar dimensions, the thickness ratio between layers, and the like in the drawings differ from actual ones.

Further, embodiments described below are exemplary configurations that embody the technical idea of the present invention, and do not limit the technical idea of the present invention to the materials, shapes and configurations of the components described below. Various modifications can be made to the technical idea of the present invention within the technical scope of the claims. The described embodiments are intended to be representative of the present invention.

(Anode for Nonaqueous Electrolyte Secondary Cell)

As shown in FIG. 1, an anode 1 for a nonaqueous electrolyte secondary cell of the present embodiment includes a collector 21 and an anode active material layer 10 formed on the collector 21.

As the collector 21, materials conventionally used as an anode collector material for a secondary cell can be adequately employed. Examples of the materials include aluminum, nickel, copper, iron, stainless steel (SUS), and titanium. Specifically, from the viewpoint of electron conductivity and cell operating potential, copper is especially preferred. The collector 21 of such a type generally has a thickness of about 10 μm to 30 μm.

The anode active material layer 10 has an anode active material 11, a graphite material 12 and a binder 14. The anode active material layer 10 may contain a conductive assistant 13.

Active materials that can reversibly occlude and release lithium (Li) include materials that are alloyed with lithium. For example, one or more materials selected from the group consisting of Si, Ge, Sn, Pb, Al, Ag, Zn, Hg and Au are alloyed with lithium.

In the present embodiment, $SiO_x$ particles are used as the anode active material 11. It is preferable that x is 1.5 or less. If x exceeds 1.5, a sufficient amount of occlusion and release of lithium is not necessarily ensured. In addition to $SiO_x$, the graphite material 12 is added as the active material.

The anode active material 11 of the present embodiment comprises $SiO_x$ particles having surfaces to which an organic material 11a is bonded. The organic material 11a has one or more functional groups selected from the group consisting of a phenylamino group, an imidazole group and an amino group.

The anode 1 for a nonaqueous electrolyte secondary cell of the present embodiment can be formed by coating and drying a slurry which is obtained by adding a solvent to the mixture containing, for example, the anode active material 11, the graphite material 12, the conductive assistant 13 and the binder 14.

The aforementioned solvent is not particularly limited as long as the binder resin can be dissolved therein, and includes organic solvents, such as N-methylpyrrollidone, and N, N-dimethylformamide, or water.

The anode active material 11 made up of $SiO_x$ particles preferably has a particle size of 0.5 μm or more to 10 μm or less in terms of d50 (median size: a particle size with an integrated value of 50%, and represents an average particle size). If d50 of the anode active material 11 is greater than 10 μm, the current relative to the surface area of the total active material increases, and thus the electrode resistance increases and the capacity decreases. If d50 is less than 0.5 μm, particles of the active material are likely to aggregate in the process of preparing electrode slurry, and thus it is difficult to obtain a slurry in which particles of the active material are uniformly dispersed. As a result, the electrode resistance increases, and the capacity decreases.

The graphite material 12 is not particularly limited, and a known material can be used. As the graphite material 12, specifically, artificial graphite or natural graphite is preferred. The particle size (d50) of the graphite material 12 is not particularly limited, but 0.5 μm or more is preferred. If d50 is less than 0.5 μm, the graphite material is likely to aggregate in the process of preparing electrode slurry, and thus it is not only difficult to obtain a slurry in which particles are uniformly dispersed, but also due to increase of the specific surface area, a large amount of the binder 14 will be needed. As a result, the content of the active material decreases, which leads to decrease in the capacity.

The graphite material 12 is preferably contained by 20 mass % or more and 80 mass % or less relative to the total mass of the active material. If the content is less than 20 mass %, due to the influence of the change in the volume of the silicon-based active material, the anode is likely to be peeled from the collector, and if the content is greater than 80%, the content of the silicon-based active material in the electrode decreases. As a result, the capacity relative to the volume greatly decreases.

The anode for a nonaqueous electrolyte secondary cell of the present embodiment may contain the conductive assistant 13. Materials that can be used for the conductive assistant 13 include carbon black, natural graphite, artificial graphite, and further, a metal oxide such as titanium oxide or ruthenium oxide, and metal fibers. Among these materials, carbon black is preferred because of its structure, and in particular, furnace black, ketjen black, or acetylene black (AB), which is a kind of carbon black, is more preferably used. As the conductive assistant 13, a mixture of carbon black and other conductive assistants such as vapor grown carbon fiber (VGCF) is also preferably used.

The preferred content of the conductive assistant is from 1 mass part or more to 90 mass part or less relative to 100 parts by mass of the active material. When the content is less than 1 mass %, the conductivity may become insufficient and the electrode resistance may increase. When the content is 90 mass % or more, the amount of the active material may become insufficient which may lead to decrease in the amount of lithium occlusion.

For the binder 14, a water-soluble polymer made of acrylic acid containing a carboxyl group or a salt thereof can be used. As the salt, sodium acrylate is preferred. These binders are hydrogen bonded with a functional group of the organic material 11a which is bonded to the surface of the anode active material 11 made up of $SiO_x$ particles. Poly acrylic acid or poly (sodium acrylate) can be used singly or in combination within the range of design as long as the performance permits. Two or more binders having different average molecular weights can be mixed. For example, when a low molecular weight acrylic acid having an average molecular weight of several hundreds to several thousands is mixed with a high molecular weight acrylic acid having an average molecular weight of several hundred thousand to several million, the low molecular weight acrylic acid acts as a dispersant and efficiently wets the surfaces of the active material particles and the graphite material particles. Meanwhile, the high molecular weight acrylic acid plays a role of a skeletal outline supporting the entirety. Thus, due to further increase in the binding properties, detaching of the active material can be prevented in the progress of the battery cycle.

When the total mass of the active material is 100 in terms of a mass ratio, the binder 14 is preferred to be contained in the active material layer at a ratio of 3 or more to 40 or less, and more preferably 3 or more to 30 or less. When the content of the binder 14 is less than 3, binding of the active material becomes insufficient, and when the content of the binder 14 exceeds 40, the capacity per unit volume of the electrode greatly decreases.

As a method for binding the organic material 11a having a specific functional group onto the surface of the anode active material 11, a method using a silane coupling agent can be used. The silane coupling agent is represented by the following Formula (1), and is configured by an alkoxy group (X) and a functional group (Y). Other than the method using the silane coupling agent represented by Formula (1), there is a method using siloxane resulting from condensation between the silane coupling agents.

$$X_3\text{—Si—Y} \tag{1}$$

In Formula (1), X represents a methoxy group, an ethoxy group, or a propoxy group.

Y is expressed by —$(CH_2)_n$—Y', where n is 0 or more and 10 or less, and Y' can be, for example, any one of —NH$(C_6H_5)$, -2-imidazolin-1-yl, —$NH_2$, —$NH(CH_2)_2NH_3$, —$CH_3$, and —$C_6H_5$.

The organic material 11a is preferably bonded to the surface of the anode active material 11 as a result of treating the anode active material 11 with the silane coupling agent represented by Formula (1). Preferred coupling agents to be used are silane coupling agents who's Y' has a phenylamino group. For example, N-phenyl-3-aminopropyl trimethoxy silane can be used.

With the organic material 11a having a phenylamino group bonded to the surface of the anode active material 11, a lone pair electron of an N atom of the phenylamino group, and the carboxyl group of the binder 14 cause hydrogen bonding which provides a strong binding strength between the binder 14 and the anode active material 11. Further, due to the π electrons of the phenyl group, the interaction between the graphite material 12, the carbon-based conductive assistant 13 and the collector 21 become strong. Thus, even after repetition of charging and discharging accompanied by a large volume change, detaching of the active material is unlikely to occur, which results in improvement in the cycle characteristics.

The anode for a nonaqueous electrolyte secondary cell of the present embodiment, is preferred to contain the active material and the graphite material so that the graphite material is in the range of 10 or more and 60 or less when the mass of the active material is 100 parts by mass. If the content of the graphite material exceeds 60 parts by mass, the contribution of the active material to the battery capacity is small and sufficient capacity cannot be acquired. If the content of the graphite material is less than 10 parts by mass, contact between the active material and the graphite material become insufficient, and detaching of the active material from the anode occurs due to charging and discharging. Thus, there is a concern that the cycle capacity decreases.

(Coin Cell)

Next, as an example of the nonaqueous electrolyte secondary cell of the present invention, a structure of a coin cell will be described. However, the structure of the nonaqueous electrolyte secondary cell of the present invention is not limited to a coin cell type.

Figure 2:
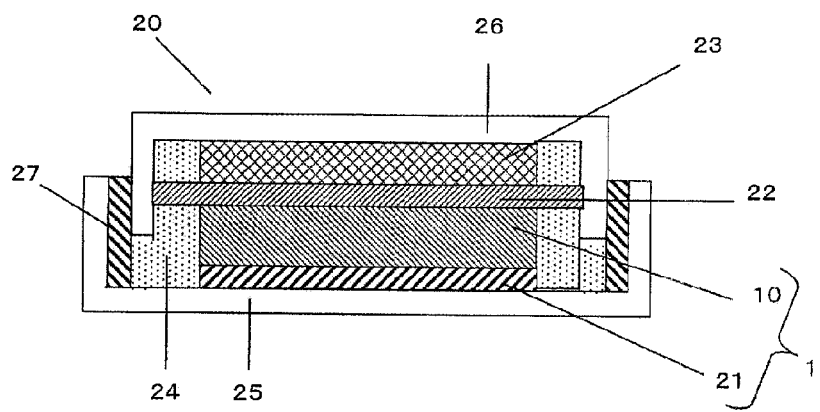
FIG. 2 is a schematic cross-sectional diagram illustrating a coin cell.

As shown in FIG. 2, inside a coin cell 20, the anode 1 and a cathode 23 are arranged facing each other with a separator 22 interposed therebetween, with an electrolytic solution 24 filled around them. The coin cell 20 has a packaging part which includes an anode case 25 arranged on the anode side, and a cathode case 26 arranged on the cathode side. The cathode case 26 has a circumferential portion which is provided with a gasket 27 for sealing the interior.

The cathode 23 can be formed in a laminated structure by laminating a cathode active material layer made up of, for example, a lithium metal foil, and a cathode collector (not shown).

The cathode active material forming the cathode active material layer may be a material that can occlude and release lithium, and known cathode active materials for nonaqueous electrolyte secondary cells can be used. Examples of the cathode active material include lithium manganese oxide, lithium nickel oxide, lithium cobalt oxide, lithium iron oxide and lithium nickel manganese oxide, and further include lithium nickel cobalt oxide, lithium nickel manganese cobalt oxide and lithium transition metal phosphate compounds. As the cathode active material, the aforementioned active materials may be used in combination.

The cathode active material layer may include a conductive assistant or a binder, other than the cathode active material. Examples of the conductive assistant contained in the cathode active material layer include known materials such as acetylene black, ketjen black, carbon black, graphite and carbon nanotube. The binder contained in the cathode active material layer is not specifically limited, as long as the mixture of the cathode active material and the conductive assistant can be adhered to the collector. Examples of such a binder include polyvinylidene fluoride and polytetrafluoroethylene.

As the collector (not shown) of the cathode 23, materials conventionally used as the cathode collector materials for the secondary cell may be suitably used. Examples of such materials include aluminum, nickel, copper, iron, stainless steel (SUS), titanium, and the like. Specifically, from the viewpoint of electron conductivity and cell operating potential, aluminum is especially preferred. A typical thickness of such a collector is approximately 10 µm to 30 µm.

The separator 22 is disposed between the cathode 23 and the anode 1 facing each other. Accordingly, the separator 22 electrically insulates between the cathode 23 and the anode 1. Examples of the separator 22 include a microporous film made of a polyolefin such as polyethylene, polypropylene or the like, a microporous film or a nonwoven fabric made of an aromatic polyamide resin, and a porous resin coat containing an inorganic ceramic powder.

The electrolytic solution 24 is filled in a space defined by the anode case 25, the cathode case 26 and the gasket 27. The electrolytic solution 24 is formed of a solvent and an electrolyte.

Examples of the solvents of the electrolytic solution used for the nonaqueous electrolyte secondary cell of the present embodiment include low-viscosity chain carbonic acid esters such as dimethyl carbonate, diethyl carbonate and the like, cyclic carbonic acid esters of high dielectric constant such as ethylene carbonate, propylene carbonate, butylene carbonate and the like, γ-butyrolactone, 1,2-dimethoxyethane, tetrahydrofuran, 2-methyltetrahydrofuran, 1,3-dioxolane, methyl acetate, methyl propionate, vinylene carbonate, dimethylformamide, sulfolane, and mixtures thereof.

Examples of the electrolyte contained in the electrolytic solution include $LiClO_4$, $LiBF_4$, $LiAsF_6$, $LiPF_6$, $LiCF_3SO_3$, $LiN(CF_3SO_2)_2$, LiI, $LiAlCl_4$, and mixtures thereof. Preferably, the electrolyte is a lithium salt obtained by mixing one or more of $LiBF_4$ and $LiPF_6$.

The gasket 27 is a member for preventing an electrical short-circuit between terminals and for preventing leakage of electrolyte. Known gaskets can be used as the gasket 27.

Effect of the Present Embodiment

The present inventors have extensively conducted investigation to further improve the cycle characteristics of a secondary cell that uses an anode for a nonaqueous electrolyte secondary cell including a collector, and an active material layer formed on the surface of the collector and containing a silicon-based active material, a binder and a graphite material, and found that surface treatment of the silicon-based active material can improve the binding properties between the silicon-based active material, the binder, and the graphite material, and thus the aforementioned problem is solved.

(1) The electrode for a nonaqueous electrolyte secondary cell includes a collector, an active material layer formed on the surface of the collector and containing an active material, a binder and a graphite material. The active material contained in the active material layer comprises $SiO_x$ particles whose surfaces are bonded with an organic material having one or more functional groups selected from the group consisting of a phenylamino group (a functional group with one H atom removed from phenylamine), an imidazole group and an amino group. Further, the binder is formed of a water-soluble polymer made of acrylic acid or a salt thereof.

According to this configuration, the anode for a nonaqueous electrolyte secondary cell includes a collector and an active material layer formed on the surface of the collector and containing a silicon-based active material, a binder and a graphite material. The silicon-based active material in the active material layer comprises $SiO_x$ particles whose surfaces are bonded with an organic material having one or more functional groups selected from the group consisting of a phenylamino group, an imidazole group and an amino group, to thereby improve binding properties between the silicon-based active material, the binder, and the graphite material.

(2) The binder may preferably be formed by using poly acrylic acid or poly (sodium acrylate) either singly or in combination.

These binders are hydrogen bonded with the functional group of the organic material which is bonded to the surface of the anode active material ($SiO_x$ particles).

For example, when a low molecular weight poly acrylic acid having an average molecular weight of several hundreds to several thousands is mixed with a high molecular weight poly acrylic acid having an average molecular weight of several hundred thousand to several million, the low molecular weight acrylic acid acts as a dispersant and efficiently wets the surfaces of the active material particles and the graphite material particles. Meanwhile, the high molecular weight acrylic acid plays a role of a skeletal outline supporting the entirety. Thus, due to further increase in the binding properties, detaching of the active material can be prevented in the progress of the battery cycle.

(3) The functional group is preferably a phenylamino group.

With the organic material 11a having a phenylamino group bonded to the surface of the anode active material 11, a strong binding strength is ensured between the binder 14 and the anode active material 11.

(4) The particle size (median size: d50) of the $SiO_x$ particles is preferably in the range of 0.5 µm or more to 10 µm or less.

This configuration suppresses the electrode resistance to thereby prevent decrease in the capacity.

(5) When the active material is 100 in terms of a mass ratio, the binder is preferably contained in the active material layer at a ratio of 3 or more to 30 or less. More preferably, the binder is contained at a ratio of 3 or more to 25 or less.

This configuration enables sufficient binding of the active material, and prevents the capacity per unit volume of the electrode from being greatly decreased.

(6) The nonaqueous electrolyte secondary cell has the electrode of the embodiment as serving an anode.

By using the anode for a nonaqueous electrolyte secondary cell of the present embodiment, cycle characteristics of the nonaqueous electrolyte secondary cell can be improved.

Example 1

Hereinafter, the electrode for a nonaqueous electrolyte secondary cell according to the present invention, and a method for manufacturing the same will be described in detail by way of Examples and Comparative Examples. Note that the following Examples do not limit the scope of the present invention.

Test No. 1: Example

First, 6.00 g of SiO particles (manufactured by OSAKA Titanium Technologies Co., Ltd) having a median size d50 of 6.6 μm were added to 30.00 g of 2-isopropyl alcohol. Then, 0.09 g of N-phenyl-3-aminopropyltrimethoxysilane was also added as a silane coupling agent, and these materials were stirred. Then, 0.60 g of water was added dropwise to the stirred mixture, followed by overnight stirring. Then, the stirred mixture was filtered while being washed with 2-isopropyl alcohol. A powder thus obtained was dried at 80° C. for 3 hours under reduced pressure. In this way, an active material was obtained, with an organic material having a phenylamino group bonded to the surfaces of the SiO particles.

4.46 g of the active material thus obtained, 1.56 g of natural graphite (manufactured by Hitachi Chemical Co., Ltd.), 0.89 g of acetylene black (HS-100, manufactured by Denki Kagaku Kogyo K.K.), 0.89 g of vapor-grown carbon fiber (manufactured by SHOWA DENKO K.K.), 1.2 g of poly acrylic acid (manufactured by TOAGOSEI CO., LTD., average molecular weight of 1,000,000) were added to 52.86 g of pure water, followed by stirring with a dispersion device, for preliminary dispersion. The dispersion liquid was further stirred for 5 minutes with Filmix (manufactured by PRIMIX Corporation), thereby obtaining an anode slurry (a slurry containing an anode active material).

Test No. 2: Example

As a silane coupling agent, 3-(2-imidazolin-2-yl)propyl-triethoxysilane was used. In this way, an active material, with an organic material having an imidazole group bonded to the surfaces of the SiO particles was obtained. Except for the above, an anode slurry was obtained in the same manner as in Test No. 1.

Test No. 3: Example

As a silane coupling agent, 3-aminopropyltriethoxysilane was used. In this way, an active material, with an organic material having an amino group bonded to the surfaces of the SiO particles was obtained. An anode slurry was obtained in the same manner as in No. 1 except for the above.

Test No. 4: Example

In the same manner as in Example 1, 6.00 g of the SiO particles having a median size d50 of 6.6 μm (manufactured by OSAKA Titanium Technologies Co., Ltd) were added to 30.00 g of 2-isopropyl alcohol. Then, 0.09 g of N-phenyl-3-aminopropyltrimethoxysilane was also added as a silane coupling agent, and these materials were stirred. Then, 0.60 g of water was added dropwise to the stirred mixture, followed by overnight stirring. Then, the mixture stirred overnight was filtered while being washed with 2-isopropyl alcohol. A powder thus obtained was dried at 80° C. for 3 hours under reduced pressure. In this way, an active material, with an organic material having a phenylamino group bonded to the surfaces of the SiO particles was obtained.

6.0 g of the active material thus obtained, 1.2 g of acetylene black (HS-100, manufactured by Denki Kagaku Kogyo K.K.), 1.2 g of vapor-grown carbon fiber (manufactured by SHOWA DENKO K.K.), 1.8 g of poly (sodium acrylate) (manufactured by TOAGOSEI CO., LTD., average molecular weight of 1,000,000) were added to 52.86 g of pure water, followed by stirring with a dispersion device, for preliminary dispersion. The dispersion liquid was further stirred for 5 minutes with Filmix (manufactured by PRIMIX Corporation), thereby obtaining an anode slurry (a slurry containing an anode active material).

Test No. 5: Example

As a silane coupling agent, 3-(2-imidazoline-2-yl)propyltriethoxysilane was used. In this way, an active material, with an organic material having an imidazole group bonded to the surfaces of the SiO particles was obtained. Except for the above, an anode slurry was obtained in the same manner as in No. 5.

Test No. 6: Example

As a silane coupling agent, 3-aminopropyltriethoxysilane was used. In this way, an active material, with an organic material having an imidazole group bonded to the surfaces of the SiO particles was obtained. Except for the above, an anode slurry was obtained in the same manner as in No. 5.

Test No. 7: Example

As a silane coupling agent, N-phenyl-3-aminopropyltrimethoxysilane was used. In this way, an active material, with an organic material having an imidazole group bonded to the surfaces of the SiO particles was obtained. As a binder, 1.07 g of sodium acrylate (manufactured by TOAGOSEI CO., LTD., average molecular weight of 1,000,000) and 0.27 g of acrylic acid (manufactured by TOAGOSEI CO., LTD., average molecular weight of 1,000,000) were used. Except for the above, an anode slurry was obtained in the same manner as in No. 5.

Test No. 8: Comparative Example

At first, 4.4 g of the SiO particles having a median size d50 of 6.6 μm (manufactured by OSAKA Titanium Technologies Co., Ltd), 1.54 g of natural graphite (manufactured by Hitachi Chemical Co., Ltd.), 0.89 g of acetylene black, 0.87 g of vapor-grown carbon fiber, 0.89 g of acrylic acid (manufactured by TOAGOSEI CO., LTD., average molecular weight of 1,000,000) were added to 52.94 g of water, followed by stirring with a dispersion device, for preliminary dispersion. The dispersion liquid was further stirred with Filmix, thereby obtaining an anode slurry. An anode was formed from the anode slurry in the same manner as in No. 1. Namely, the SiO particles were used as they were as an active material.

Test No. 9: Example

An anode slurry was obtained in the same manner as in No. 1 except that 2.82 g of acrylic acid (manufactured by TOAGOSEI CO., LTD., average molecular weight of 1,000,000) was added as a binder.

(Fabrication of Anode Electrode Plate)

The anode slurries obtained from Test Nos. 1 to 9 were each applied to a collector. A copper foil having a thickness of 12 μm was used as a collector. Each anode slurry was applied to a collector with a doctor blade so as to have a coating weight of 2.8 mg/cm$^2$. Subsequently, the resultant object was preliminarily dried at 80° C. for 30 minutes. This was followed by pressing to attain a density of 1.0 g/cm$^3$, and further followed by drying at 105° C. for 5 hours under reduced pressure. In this way, anodes of Nos. 1 to 9 were obtained.

(Fabrication of Cell)

Each of the obtained anodes 1 of Nos. 1 to 9 and the lithium metal foil cathode 23 having a thickness of 300 μm with a separator (ID No. 2200, manufactured by Celgard, LLC.) interposed therebetween were sandwiched by the anode case 25 and the cathode case 26 to thereby fabricate the coin cell 20 shown in FIG. 2 as cells of Nos. 1 to 9. The cathode was punched out in a disk shape with a diameter of 15 mm, and the lithium metal foil was punched out in a disk shape with a diameter of 16 mm, followed by evaluation. The electrolytic solution 24 was obtained by adding LiPF6 to a mixed solvent of ethylene carbonate (EC) and diethyl carbonate (DEC) so as to be 1M and by further adding thereto 2 mass % of vinylene carbonate (VC). The ratio of ethylene carbonate (EC) and diethyl carbonate (DEC) in the mixed solvent was 3:7 (volume ratio)

(Charge/Discharge Evaluation Test)

The charge/discharge evaluation tests were performed at 0.01 V to 1.5 V for the cells of Nos. 1 to 9. First, as an initial discharge capacity evaluation, one-time constant-current charge/discharge at 0.05 C, one-time constant-current charge/discharge at 0.1 C, and one-time constant-current charge/discharge at 0.2 C were consecutively performed in this order, further followed by a cycle test. In the cycle test, 100 cycles of constant-current charge at 0.2 C and constant-current discharge at 1.0 C were performed. The results are shown in Table 1.

improved their discharge capacity retention rate compared to the cells of Test Nos. 1 to 3 containing acrylic acid serving as a binder. It is understood from this that, for a binder, use of sodium acrylate is more preferable than acrylic acid. Further, as will be appreciated from the cell of No. 7, even when a mixed composition of an acrylic acid and sodium acrylate was used as a binder, the cycle characteristics were good.

Although the cell of Test No. 9 has a better discharge capacity at the 100th cycle than the cell of Test No. 8, and has the effect obtained from the presence of the phenylamino group on the surfaces of the SiO particles, the content of the binder in the anode is excessive, and thus the discharge capacity at the $1^{st}$ cycle is low.

As set forth above, the advantageous effects of the present invention have been confirmed.

Although the above description has been made with reference to a limited number of embodiments, the scope of the invention is not limited thereto, and modifications of the above embodiments, on the basis of the above disclosure are obvious to a person having ordinary skill in the art. That is, the present invention should not be construed as being limited to the aforementioned embodiments. Design modifications or the like can be made to the above embodiments, on the basis of the knowledge of a skilled person in the art, and the modes to which such modifications or the like are

TABLE 1

| | Configuration of anode active material layer | | | | |
|---|---|---|---|---|---|
| | | Binder | | Discharge capacity [mAh/cm$^3$] | Discharge capacity retention rate [%] |
| No. | Silane coupling agent | Type | Contents relative to 100 active material | $1^{st}$ cycle / $100^{th}$ cycle | $100^{th}$ cycle |
| 1 | N-phenyl-3-aminopropyl trimethoxy silane | Poly acrylic acid | 20 | 493 / 335 | 68.0 |
| 2 | 3-(2-imidazolin-2-yl) propyltriethoxysilane | Poly acrylic acid | 20 | 462 / 285 | 61.7 |
| 3 | 3-aminopropyl triethoxy silane | Poly acrylic acid | 20 | 490 / 311 | 63.5 |
| 4 | N-phenyl-3-aminopropyl trimethoxy silane | Poly (sodium acrylate) | 30 | 614 / 591 | 96.3 |
| 5 | 3-(2-imidazolin-2-yl) propyltriethoxysilane | Poly (sodium acrylate) | 30 | 647 / 594 | 91.8 |
| 6 | 3-aminopropyl triethoxy silane | Poly (sodium acrylate) | 30 | 640 / 584 | 91.3 |
| 7 | N-phenyl-3-aminopropyl trimethoxy silane | Poly acrylic acid + poly (sodium acrylate) | 30 | 582 / 546 | 93.8 |
| 8 | None | Poly acrylic acid | 20 | 433 / 231 | 53.3 |
| 9 | N-phenyl-3-aminopropyl trimethoxy silane | Poly acrylic acid | 47 | 384 / 253 | 65.9 |

It has been found that the cells of Test Nos. 1 to 7 have higher discharge capacity at the $100^{th}$ cycle and have better cycle characteristics than the cells of Test Nos. 8 and 9. Test No. 1 shows higher discharge capacity at the $100^{th}$ cycle than Test Nos. 2 and 3, and in Test No. 1, the phenylamino group is present on the surfaces of the SiO particles (silicon-based active material). It is considered that, for these reasons, binding properties between the binder made up of the SiO particles and acrylic acid, and the graphite material were especially increased in Test No. 1, and thus the cycle characteristics were especially improved.

Further, it has been found that the cells of Test Nos. 4 to 7 containing sodium acrylate, serving as a binder, have greatly increased their discharge capacity and have also added are also encompassed within the scope of the present invention.

INDUSTRIAL APPLICABILITY

The anode for a nonaqueous electrolyte secondary cell obtained by the present invention is industrially valuable because of the effect of improving the cycle characteristics of the secondary cell using this anode. Therefore, the anode for a nonaqueous electrolyte secondary cell of the present invention is preferably applied to storage batteries, such as driving batteries for electric cars which require high durability, electric storage facilities for various types of energy, and electric storage facilities for home use.

REFERENCE SIGNS LIST

1 . . . Anode for nonaqueous electrolyte secondary cell; 10 . . . Active material layer; 11 . . . Anode active material; 11a . . . Organic material; 12 . . . Graphite material; 13 . . . Conductive assistant; 14 . . . Binder; 20 . . . Coin cell; 21 . . . Collector; 22 . . . Separator; 23 . . . Cathode; 24 . . . Electrolytic solution; 25 . . . Anode case; 26 . . . Cathode case; 27 . . . Gasket;

What is claimed is:

1. An electrode for a nonaqueous electrolyte secondary cell, comprising:

a collector, and an active material layer formed on a surface of the collector, wherein the active material layer consists of an active material, a binder, a graphite material, acetylene black, and a vapor-grown carbon fiber;

the active material consists of SiO particles, whose surfaces are bonded with an organic material, which is N-phenyl-3-aminopropyl trimethoxy silane; and the binder consists of poly (sodium acrylate).

2. The electrode for a nonaqueous electrolyte secondary cell of claim 1, wherein the SiO particles have a particle size (median size of d50) in a range of 0.5 μm or more to 10 μm or less.

3. The electrode for a nonaqueous electrolyte secondary cell of claim 1, wherein the binder is contained in the active material layer at a mass ratio of 3 or more and 30 or less when the active material has a mass of 100.

4. A nonaqueous electrolyte secondary cell having the electrode of claim 1.

5. The electrode for a nonaqueous electrolyte secondary cell of claim 1, wherein the graphite material has a particle size of 0.5 μm or more and wherein a content of the graphite material in the active material layer is from 20 mass % or more to 80 mass % or less relative to the total mass of the active material.

6. The electrode for a nonaqueous electrolyte secondary cell of claim 1, wherein the binder is contained in the active material layer at a mass ratio of 3 or more and 30 or less when the active material has a mass of 100.

* * * * *